United States Patent
Kim et al.

(10) Patent No.: US 12,230,749 B2
(45) Date of Patent: Feb. 18, 2025

(54) DEVICE FOR FOLDING POUCH

(71) Applicant: LG Energy Solution, Ltd., Seoul (KR)

(72) Inventors: Geun Hee Kim, Daejeon (KR); Se Young Oh, Daejeon (KR); Jung Su Oh, Daejeon (KR); Jeong Min Ha, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 38 days.

(21) Appl. No.: 18/030,206

(22) PCT Filed: Nov. 3, 2021

(86) PCT No.: PCT/KR2021/015814
§ 371 (c)(1),
(2) Date: Apr. 4, 2023

(87) PCT Pub. No.: WO2022/098094
PCT Pub. Date: May 12, 2022

(65) Prior Publication Data
US 2023/0378509 A1    Nov. 23, 2023

(30) Foreign Application Priority Data

Nov. 3, 2020   (KR) .................. 10-2020-0145441
Nov. 2, 2021   (KR) .................. 10-2021-0148732

(51) Int. Cl.
*H01M 10/04*      (2006.01)
*B29C 53/06*      (2006.01)
(Continued)

(52) U.S. Cl.
CPC ....... *H01M 10/0404* (2013.01); *B29C 53/063* (2013.01); *H01M 50/105* (2021.01); *B29L 2031/3468* (2013.01)

(58) Field of Classification Search
CPC ......... H01M 10/0404; H01M 10/0431; H01M 10/052; H01M 50/105; H01M 50/116;
(Continued)

(56) References Cited

U.S. PATENT DOCUMENTS

2012/0321935 A1* 12/2012 Kim .................. H01M 50/193
                                                               29/623.2
2016/0079571 A1*  3/2016 Seong ................. H01M 50/10
                                                               429/185
(Continued)

FOREIGN PATENT DOCUMENTS

JP     2003-303576 A    10/2003
KR    2015-0049969 A     5/2015
(Continued)

OTHER PUBLICATIONS

Extended European Search Report including Written Opinion for Application No. 21889559.7 dated Mar. 25, 2024, pp. 1-7.
(Continued)

*Primary Examiner* — Nahida Sultana
(74) *Attorney, Agent, or Firm* — Lerner David LLP

(57) ABSTRACT

A device for folding a pouch having first and second cup parts, first and second circumferential parts formed flat along circumferences thereof, respectively, includes: lower and upper nests on which the first and second cup parts are seated; first and second guides fixed to the lower and upper nests and having first and second protrusions protruding upwardly therefrom, the first and second protrusions in close contact with each other forming a support protrusion; and a pressing part allowing a connection part of the first and second circumferential parts to be in close contact with the support protrusion when the first and the second cup parts are seated on the lower and the upper nests, respectively, wherein when the pressing part causes the connection part and the support protrusion to be in contact, the upper nest
(Continued)

rotates so that the second cup part is folded onto the first cup part.

16 Claims, 6 Drawing Sheets

(51) Int. Cl.
  *H01M 50/105* (2021.01)
  *B29L 31/34* (2006.01)
(58) Field of Classification Search
  CPC ............. H01M 50/119; H01M 50/133; H01M 50/121; B29C 53/063; B29C 53/36; B29L 2031/3468; B29L 1/00; Y02E 60/10
  See application file for complete search history.

(56) References Cited

U.S. PATENT DOCUMENTS

| | | | | |
|---|---|---|---|---|
| 2016/0141711 | A1* | 5/2016 | Jung | H01M 10/0431 29/623.2 |
| 2017/0012252 | A1 | 1/2017 | Yoo et al. | |
| 2020/0067029 | A1 | 2/2020 | Park et al. | |
| 2020/0112001 | A1 | 4/2020 | Jung et al. | |
| 2020/0280044 | A1 | 9/2020 | Park et al. | |
| 2022/0006114 | A1* | 1/2022 | Bae | H01M 50/107 |
| 2022/0109218 | A1 | 4/2022 | Park et al. | |
| 2022/0123354 | A1* | 4/2022 | Lee | B29C 66/73921 |
| 2023/0105613 | A1* | 4/2023 | Kim | H01M 50/141 |
| 2023/0150176 | A1* | 5/2023 | Lee | H01M 50/105 264/239 |

FOREIGN PATENT DOCUMENTS

| | | |
|---|---|---|
| KR | 2015-0137654 A | 12/2015 |
| KR | 20160059780 A | 5/2016 |
| KR | 20160100602 A | 8/2016 |
| KR | 20170089276 A | 8/2017 |
| KR | 2018-0017896 A | 2/2018 |
| KR | 101858680 B1 | 5/2018 |
| KR | 20190024755 A | 3/2019 |
| KR | 20190075593 A | 7/2019 |
| KR | 20190106473 A | 9/2019 |
| KR | 102148997 B1 | 8/2020 |
| KR | 1020200117177 A | 10/2020 |
| KR | 2020-0140578 A | 12/2020 |

OTHER PUBLICATIONS

International Search Report for PCT/KR2021/015814 mailed Feb. 17, 2022. 3 pgs.

* cited by examiner

DEVICE FOR FOLDING POUCH

CROSS-REFERENCE TO RELATED APPLICATIONS

The present application is a national phase entry under 35 U.S.C. § 371 of the International Application No. PCT/KR2021/015814 filed on Nov. 3, 2021, which claims priority from Korean Patent Application Nos. 10-2020-0145441, filed on Nov. 3, 2020, and 10-2021-0148732, filed on Nov. 2, 2021, the disclosures of which are incorporated herein by reference in their entireties.

FIELD OF THE INVENTION

The present invention relates to a device for folding a pouch having a first cup part and a second cup part to accommodate an electrode assembly, and more particularly, to a device for folding a pouch, which more efficiently supports a portion to be folded between a first cup part and a second cup part to facilitate accurate folding in selected portions.

BACKGROUND OF THE INVENTION

In general, types of secondary batteries include a nickel-cadmium battery, a nickel-hydrogen battery, a lithium-ion battery, a lithium-ion polymer battery and so on. Such secondary batteries have been applied to and used in not only small products such as digital camera, P-DVD, MP3P, mobile phone, PDA, portable game device, power tool and E-bike, but also large products, such as electric vehicle and hybrid vehicle, which require higher powers, energy storage devices for storing surplus electricity or new renewable energy, and energy storage devices for backup.

In order to manufacture such a secondary battery, a positive electrode collector and a negative electrode collector are coated with electrode active material slurry to make a positive electrode and a negative electrode, and then the positive electrode and the negative electrode are stacked alternately with a separator therebetween to form an electrode assembly having a predetermined shape. Thereafter, a battery case accommodates the electrode assembly and is sealed after injection of an electrolyte to manufacture the secondary battery.

The secondary batteries are classified into a pouch type, a can type, etc., according to a material of the case for accommodating the electrode assembly. A pouch type secondary battery is manufactured so that an electrode assembly is accommodated and sealed in a pouch made of a flexible polymer material, and a can type secondary battery is manufactured so that an electrode assembly is accommodated in a case made of a material such as metal or plastic.

The pouch to be provided as a case of the pouch type secondary battery is manufactured so that one or two cup parts are formed by press processing of a pouch film having flexibility. After the cup part is formed, an accommodation space of the cup part accommodates an electrode assembly, and a circumferential part of a side thereof is sealed to manufacture the secondary battery.

Referring to FIG. 1*a* illustrating configurations before and after an electrode assembly is mounted in a pouch, a material of the pouch 10 is modified by press to form a first cup part 1 and a second cup part 2, each of which is formed in a concave shape to have a predetermined size of a space formed therein, and unpressed parts form a first circumferential part 1*a* and a second circumferential part 2*a* along circumferences.

In addition, when an electrode assembly 4 is mounted in the first cup part 1, the second cup part 2 is folded along a connection part 3 that is a portion folded between the first cup part 1 and the second cup part 2, and the first circumferential part 1*a* and the second circumferential part 2*a* are in contact with each other. Thereafter, heat and pressure are applied to the first circumferential part 1*a* and the second circumferential part 2*a* in contact with each other, followed by sealing.

Meanwhile, referring to FIG. 1B illustrating configurations in which a pouch is being folded according to a conventional method, a conventional folding device has a structure in which an upper nest 40 and a lower nest 30 are coupled through a guide 50 (50*a* and 50*b*), and one side part 50*b* of the guide is coupled to the upper nest 40 and another side part 50*a* is coupled to the lower nest 30. In addition, the guide 50 has a structure in which a support protrusion 51 protrudes to support a bottom surface of a connection part 3. One side part 51*b* of the support protrusion 51 protrudes from the one side part 50*b* of the guide, and another side part 51*a* protrudes from the other side part 50*a* of the guide.

In a state where the first cup part 1, the second cup part 2 and the connection part 3 are placed on the lower nest 30, the upper nest 40 and the support protrusion 51, when the upper nest 40 rotates, the connection part 3 is folded so that the second cup part 2 is placed on the first cup part 1 as illustrated in FIG. 1B.

However, in such a conventional structure, there has been a case where the connection part 3 is separated from the support protrusion 51 during rotation of the upper nest 40 and is thus incompletely folded. In particular, since there might be a difference in separation occurrence rate, etc. according to flexibility, strength, etc. of the pouch 10, there has been a problem that the consistent folding quality is difficult to secure.

BRIEF SUMMARY OF THE INVENTION

Therefore, a main object of the present invention is to provide a device for folding a pouch, which is capable of solving the problem of incomplete folding caused by separation of a connection part from a support protrusion.

According to the present invention for solving the problems as described above, a device for folding a pouch which has a first cup part and a second cup part, each having a concavely recessed shape to accommodate an electrode assembly, and in which a first circumferential part is formed flat along a circumference of the first cup part and a second circumferential part is formed flat along a circumference of the second cup part, includes: a lower nest on which the first cup part is seated; an upper nest on which the second cup part is seated; a guide provided with a first guide fixed to the lower nest and having a first protrusion protruding upwardly therefrom, and a second guide fixed to the upper nest and having a second protrusion protruding upwardly therefrom, the first protrusion and the second protrusion which protrude from the first guide and the second guide being in close contact with each other to form a support protrusion; and a pressing part that allows a connection part of the first circumferential part and the second circumferential part to be in close contact with the support protrusion when the first cup part and the second cup part are seated on the lower nest and the upper nest, respectively. In a state where the pressing part allows the connection part to be in close contact with the support protrusion, the upper nest rotates so that the second cup part is folded to be on the first cup part.

When the first guide and the second guide are in horizontal contact with each other, the lower nest and the upper nest may be horizontal.

The first protrusion may protrude from the first guide, the second protrusion may protrude from the second guide, and the first protrusion and the second protrusion may be in close contact with each other to form the support protrusion, wherein, when the upper nest rotates, the first protrusion and the second protrusion in close contact with each other may be separated to be spread apart from each other.

The first protrusion may be formed integrally with the first guide, and the second protrusion may be formed integrally with the second guide.

The first protrusion and the second protrusion may respectively define, as slopes, surfaces in contact with the first cup part and the second cup part so that the support protrusion has a cross-sectional shape getting sharper towards an end.

A first corner formed between surfaces that are perpendicular to each other as the first protrusion protrudes from the first guide, and a second corner formed between surfaces that are perpendicular to each other as the second protrusion protrudes from the second guide, may be formed to be curved surfaces.

The pressing part may include a body part that allows the connection part of the first circumferential part and the second circumferential part to be in close contact with the support protrusion and an extension part that extends from the body part and allows a sidewall surface of the first cup part to be in close contact with the first protrusion when the body part presses the connection part.

A seating groove may be formed between the extension part and the body part so that an upper end of the support protrusion is seated thereon.

A first corner may be formed between surfaces that are perpendicular to each other as the first protrusion protrudes from the first guide, and when the body part of the pressing part allows the connection part to be in close contact with the support protrusion, the extension part may allow the first cup part to be in close contact with the first corner.

In addition, the pressing part may be configured so that an end protrudes from the extension part to such an extent that when the extension part is in close contact with the first protrusion, the body part is in contact only with the first protrusion and not in contact with the second protrusion.

The pouch may be manufactured by stacking an inner layer made of a polymer; an outer layer made of a different type of a polymer from the inner layer; and a metal layer stacked between the inner layer and an outer layer and made of an aluminum material.

Alternatively, a device for folding a pouch provided in the present invention may include a guide in which a second guide is omitted and a first guide is included alone.

That is, the device for folding the pouch according to the present invention may include a lower nest, an upper nest, and a pressing part, and the guide may be included in a configuration fixed to the lower nest and having a support protrusion protruding upwardly.

The present invention having the technical features as above may prevent the separation phenomenon of the connection part because the pressing part allows the connection part to be in close contact with the support protrusion during the rotation of the upper nest.

The first protrusion and the second protrusion respectively define, as slopes, surfaces in contact with the first cup part and the second cup part so that the support protrusion has the cross-sectional shape getting sharper towards the end thereof. Accordingly, the first protrusion and the second protrusion may be brought into closer contact with the outside surfaces of the first cup part and the second cup part.

The pressing part may include the body part that allow the connection part of the first circumferential part and the second circumferential part to be in close contact with the support protrusion and the extension part that extends from the body part and allows the sidewall surface of the first cup part to be in close contact with the first protrusion when the body part presses the connection part. Accordingly, the wider portion (e.g., the inner surface of the first cup part) is brought into close contact with the support protrusion, and thus the connection part may be more stably supported on the support protrusion during the folding.

In addition, the seating groove may be formed between the extension part and the body part so that the upper end of the support protrusion is seated thereon. Accordingly, the pressing part may be stably supported on the support protrusion.

Moreover, the first corner may be formed between the surfaces that are perpendicular to each other as the first protrusion protrudes from the first guide, and when the body part of the pressing part allows the connection part to be in close contact with the support protrusion, the extension part may allow the first cup part to be in close contact with the first corner. Accordingly, the separation of the pressing part may be prevented, and the deformation of the first cup part may be prevented.

DETAILED DESCRIPTION

Figure 1A:
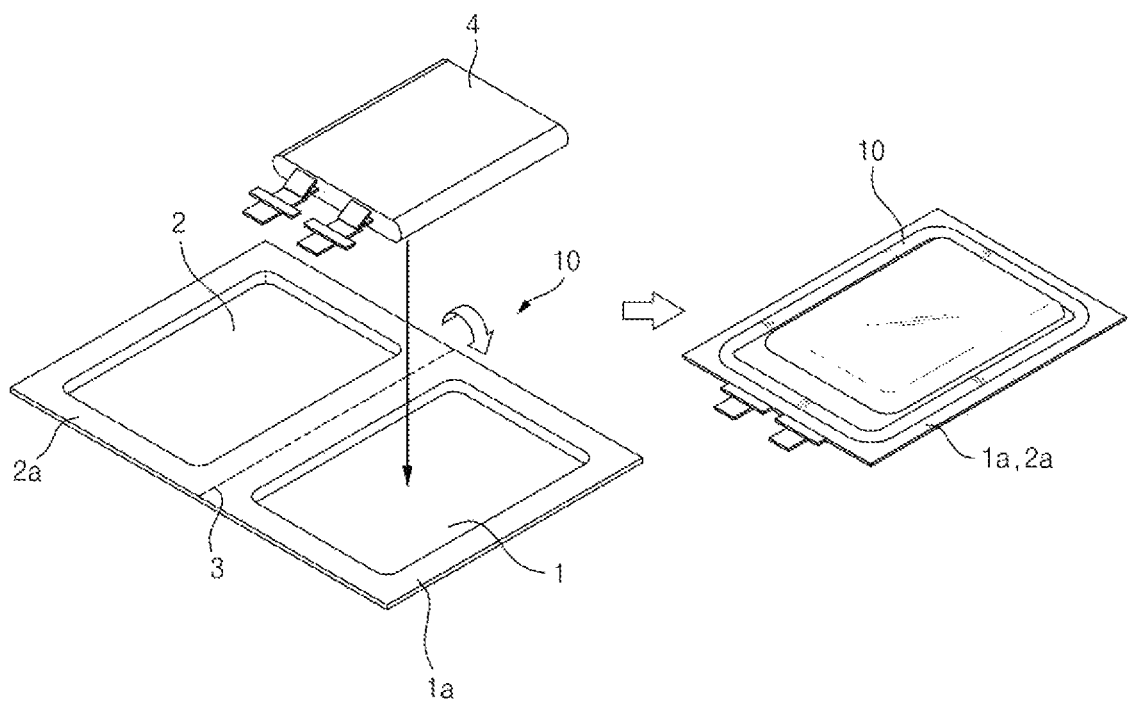
FIG. 1A is a view illustrating configurations before and after an electrode assembly is mounted in a pouch.
Figure 1B:
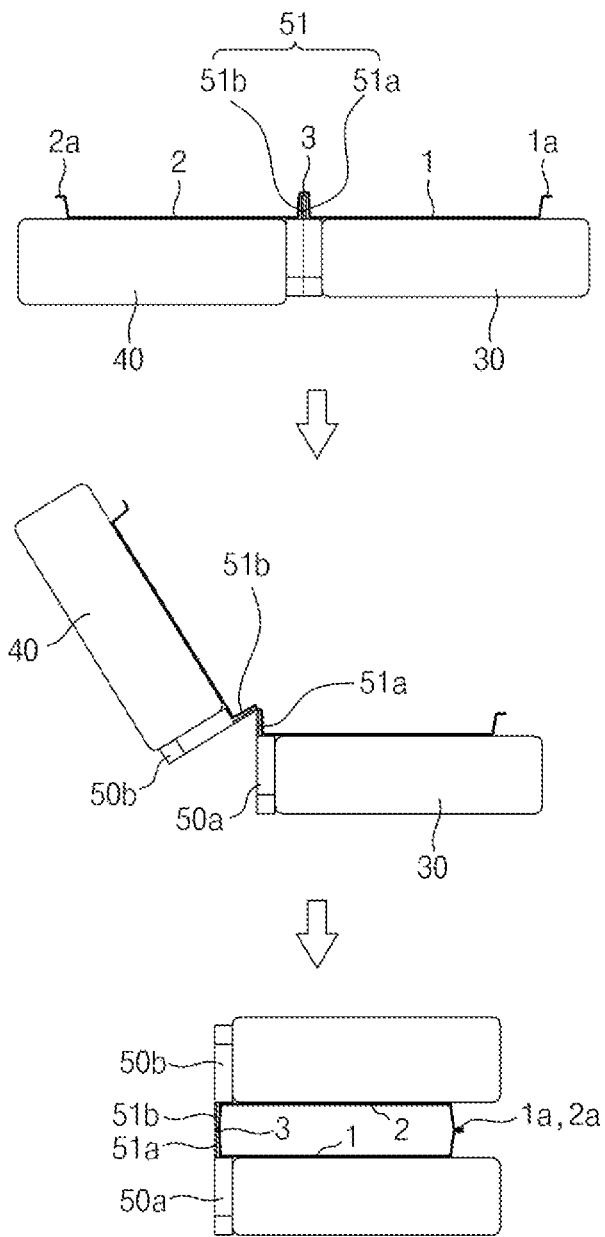
FIG. 1B is a view illustrating configurations in which a pouch is being folded by a method according to a related art.

Hereinafter, the present invention will be described in detail with reference to the accompanying drawings to enable those skilled in the art to which the present invention pertains to easily carry out the present invention. The present invention may, however, be embodied in different forms and should not be construed as limited to the embodiments set forth herein.

The parts unrelated to the description will be ruled out in order to clearly describe the present invention. Like reference numerals refer to like elements throughout the whole specification.

Moreover, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a device for folding a pouch 10 which has a first cup part 1 and a second cup part 2, each having a concave shape to accommodate an electrode assembly, and in which a first circumferential part 1a is formed flat along a circumference of the first cup part 1, and a second circumferential part 2a is formed flat along a circumference of the second cup part 2. Hereinafter, the device for folding the pouch according to the present invention will be described in more detail with reference to the accompanying drawings.

Figure 2:
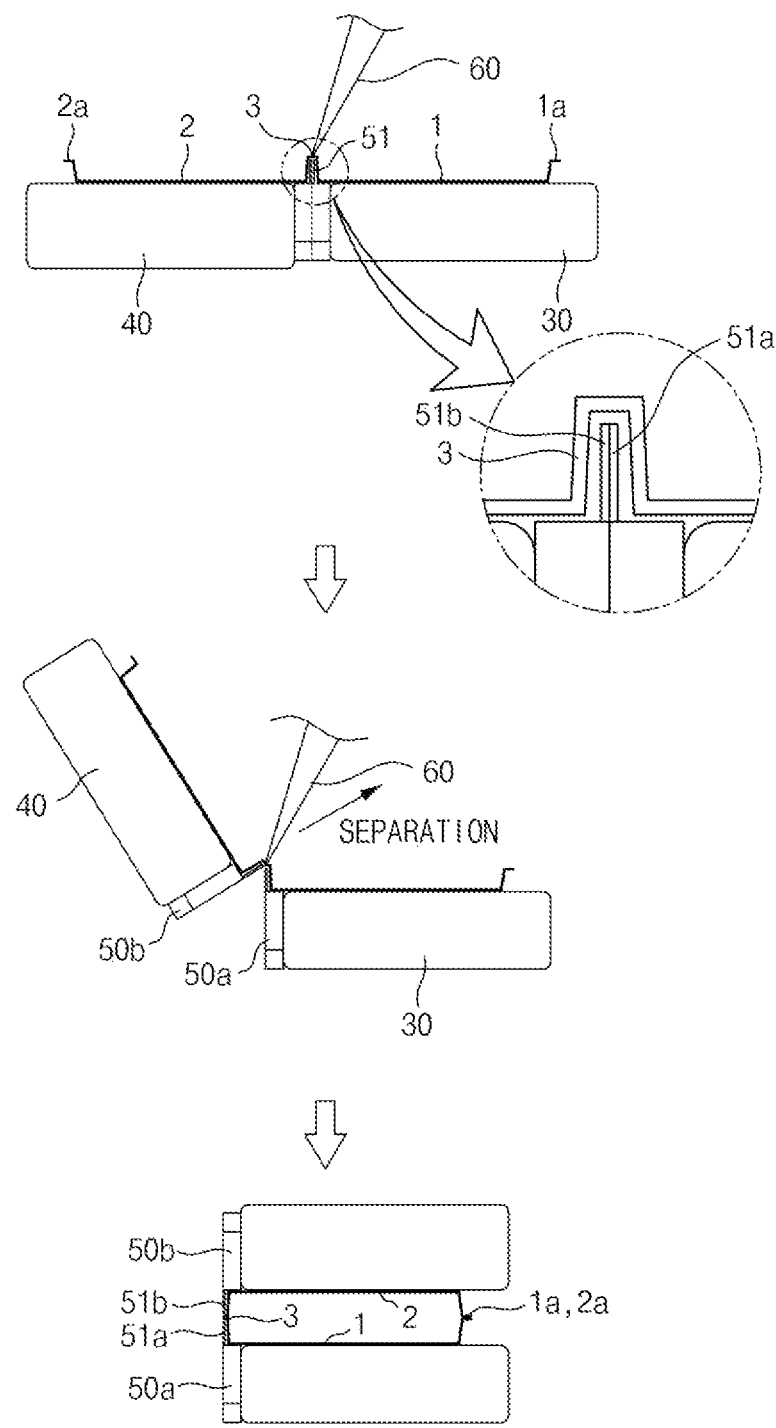
FIG. 2 is a view illustrating configurations in which a pouch is being folded in a state where a pressing part supports a connection part.

As in FIG. 2 illustrating configurations in which a pouch is being folded in a state where a pressing part supports a connection part, a folding device according to the present invention includes a lower nest 30, an upper nest 40, a guide 50 and a pressing part 60.

The lower nest 30 is sized to have the first cup part 1 of the pouch 10 seated thereon, and defines a seating surface as a flat surface. The upper nest 40 is sized to have the second cup part 2 of the pouch 10 seated thereon, and defines a seating surface as a flat surface.

The guide 50 includes a first guide 50a and a second guide 50b. The first guide 50a has a structure fixed to one side (i.e., one side facing the upper nest) of the lower nest 30 and having a first protrusion 51a protruding upwardly therefrom.

The second guide 50b is fixed to one side (i.e., one side facing the lower nest) of the upper nest 40 and has a second protrusion 51b protruding upwardly therefrom. When the upper nest 40 and the lower nest 30 are placed to be parallel to each other, the first guide 50a and the second guide 50b are in close contact with each other. When the upper nest 40 rotates, the first guide 50a and the second guide 50b may be spread apart.

That is, in the guide 50, the first guide 50a and the second guide 50b can be in close contact with and separated from each other (being separated herein means being spread apart so that an angle formed therebetween increases as illustrated in FIG. 2). The first protrusion 51a and the second protrusion 51b form the support protrusion 51 in a state in close contact with each other.

In addition, the pressing part 60 further provided in the present invention approaches a connection part 3 of the first circumferential part 1a and the second circumferential part 2a to allow the connection part 3 to be in close contact with the support protrusion 51 when the first cup part 1 and the second cup part 2 are seated on the lower nest 30 and the upper nest 40, respectively.

Thus, as illustrated in FIG. 2, in a state where the first cup part 1 and the second cup part 2 are seated on the lower nest 30 and the upper nest 40, respectively, and the connection part 3 is placed on the support protrusion 51, the pressing part 60 comes to allow the connection part 3 to be in close contact with the support protrusion 51.

In addition, the upper nest 40 starts to rotate so that the second cup part 2 is folded onto the first cup part 1. The pressing part 60 is separated before the upper nest 40 is in contact with the pressing part 60. The upper nest 40 rotates upwardly until being parallel with the lower nest 30.

Meanwhile, when the first guide 50a and the second guide 50b provided in the present invention are in horizontal contact with each other, the lower nest 30 and the upper nest 40 are horizontal. The first guide 50a is formed integrally to have the first protrusion 51a protruding therefrom, and the second guide 50b is formed integrally to have the second protrusion 51b protruding therefrom. Accordingly, the first protrusion 51a and the second protrusion 51b are brought into close contact with each other to form the support protrusion 51. In addition, when the upper nest 40 rotates, the first protrusion 51a and the second protrusion 51b in close contact with each other are separated to be spread apart from each other. Here, the first protrusion 51a and the second protrusion 51b in close contact with each other being separated to be spread apart from each other means that the second protrusion 51b is separated to be spread apart from the first protrusion 51a while rotating with the rotation of the upper nest 40, and in particular, may mean that the second protrusion 51b rotates about end portions, serving as a center of rotation, protruding from the first protrusion 51a and the second protrusion 51b, and accordingly is separated so that an angle between the first protrusion 51a and the second protrusion 51b increases. Moreover, the pressing part 60 provided in the present invention may include only a body part 61 having a shape getting sharper towards an end, and may further include an extension part 62 extending from the body part 61.

Figure 3:
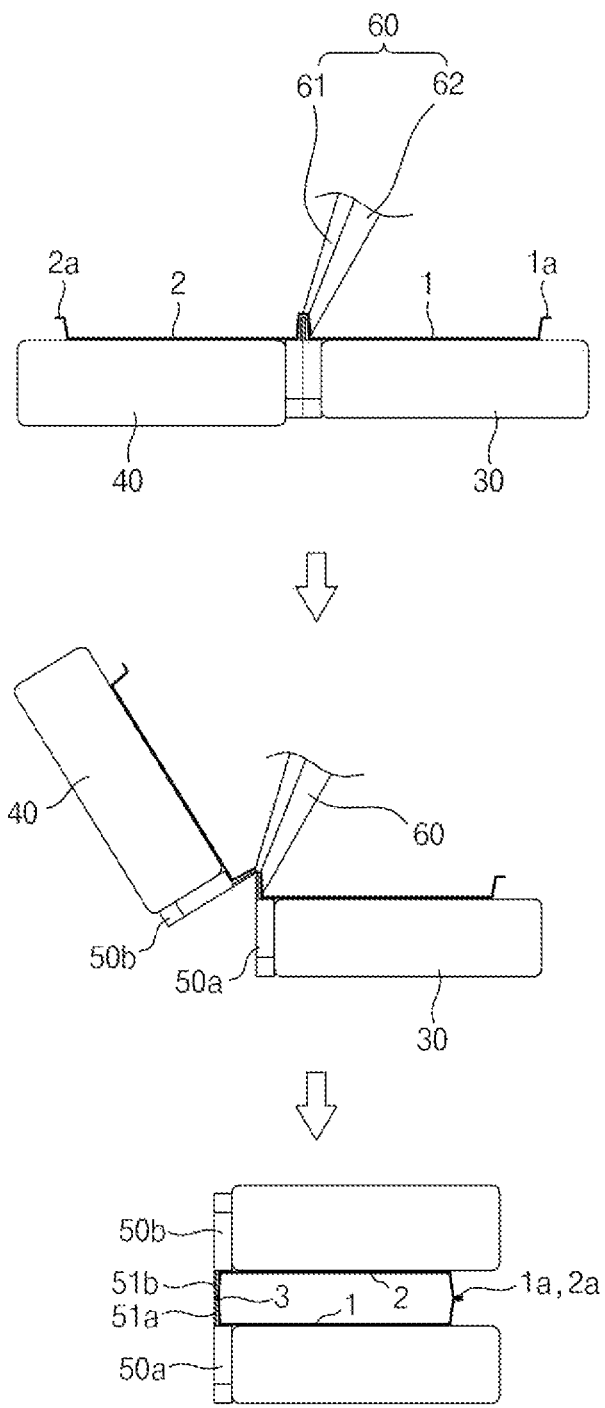
FIG. 3 is a view illustrating configurations in which a pouch is being folded in a state where the pressing part having an extension part formed therein supports the connection part.
Figure 4:
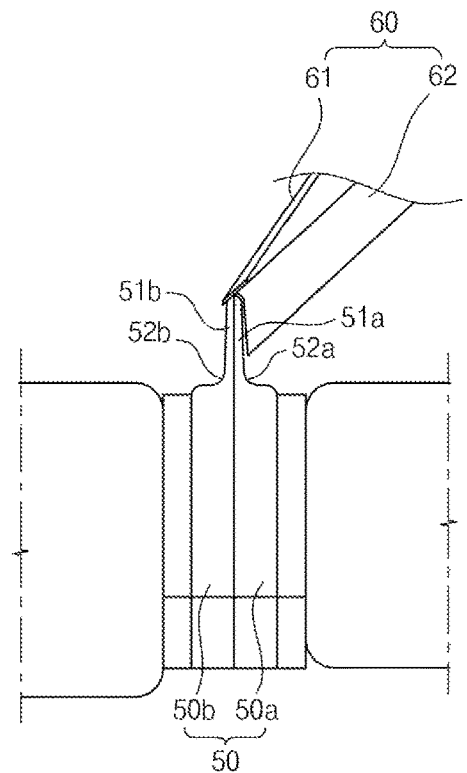
FIG. 4 is a view illustrating a configuration in which the pressing part having the extension part formed therein is in contact with the support protrusion.
Figure 5:
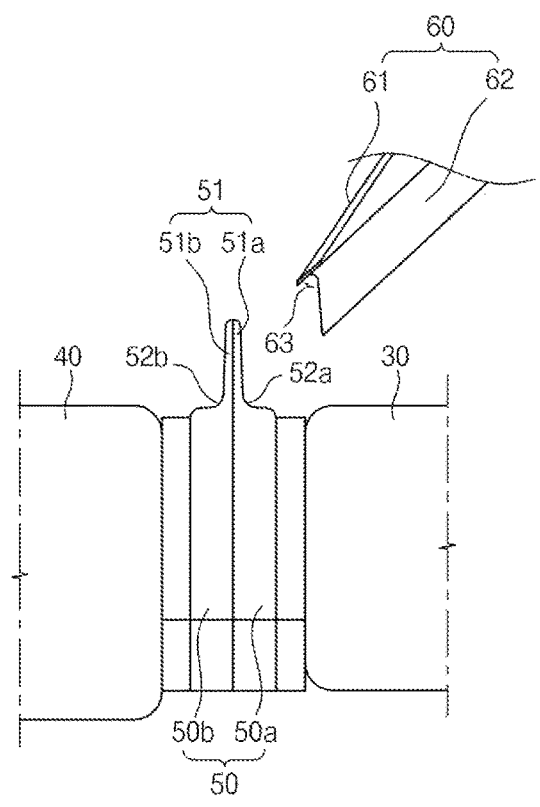
FIG. 5 is a view illustrating a configuration in which the pressing part having the extension part formed therein is spaced apart from the support protrusion.

Referring to FIG. 3 illustrating configurations in which the pouch 10 is being folded in a state where the pressing part 60 having an extension part 62 formed therein supports the connection part 3, FIG. 4 illustrating the configuration in which a pressing part 60 having an extension part 62 formed therein is in contact with the support protrusion 51, and FIG. 5 illustrating a configuration in which the pressing part 60 having an extension part 62 formed therein is spaced apart from the support protrusion 51, the pressing part 60 provided in the present invention includes a body part 61 that allows a connection part 3 of a first circumferential part 1a and a second circumferential part 2a to be in close contact with a support protrusion 51 and the extension part 62 that extends along one side of the body part 61 so that the area become larger, and allows a sidewall surface of a first cup part 1 to be in close contact with a first protrusion 51a when the body part 61 presses the connection part 3.

As illustrated in FIG. 3, the extension part 62 allows an outer surface of the first cup part 1 to be in close contact with a side surface of the support protrusion 51 when the body part 61 allows the connection part 3 to be in close contact with the support protrusion 51. Accordingly, the likelihood of separation that may occur in the first cup part 1 may be further decreased.

In addition, as more clearly illustrated in FIG. 5, a seating groove 63 is formed between the extension part 62 and the body part 61 so that an upper end of the support protrusion 51 is seated thereon. The seating groove 63 enables the pressing part 60 to be seated on the support protrusion 51 so that the extension part 62 may be held on the support protrusion 51 when the body part 61 supports the connection part 3. Accordingly, the pressing part 60 may be more stably kept in a fixed position.

As illustrated in FIGS. 4 and 5, in the present invention, the first protrusion 51a and the second protrusion 51b respectively define, as slopes, surfaces in contact with the first cup part 1 and the second cup part 2 so that the support protrusion 51 has a cross-sectional shape getting sharper towards an end.

That is, after processed by press, the first cup part 1 and the second cup part 2 are cooled and contracted to have a configuration in which a slight upward slope is formed, not a fully perpendicular configuration. Accordingly, the first protrusion 51*a* and the second protrusion 51*b* define, as slopes, surfaces in contact with the first cup part 1 and the second cup part 2 so as to be in close contact with outer surfaces of the first cup part 1 and the second cup part 2 to avoid an occurrence of an unnecessary gap.

In addition, for the same reason (in consideration of contraction after the press processing, or intentionally), corner portions of the first cup part 1 and the second cup part 2 have a structure rounded with a predetermined curvature. Accordingly, in order for the support protrusion 51 to be in close contact with the rounded portions of the first cup part 1 and the second cup part 2, a first corner 52*a* formed between surfaces that are perpendicular to each other as the first protrusion 51*a* protrudes from the first guide 50*a*, and a second corner 52*b* formed between surfaces that are perpendicular to each other as the second protrusion 51*b* protrudes from the second guide 50*b*, are formed to be curved surfaces.

Figure 6:
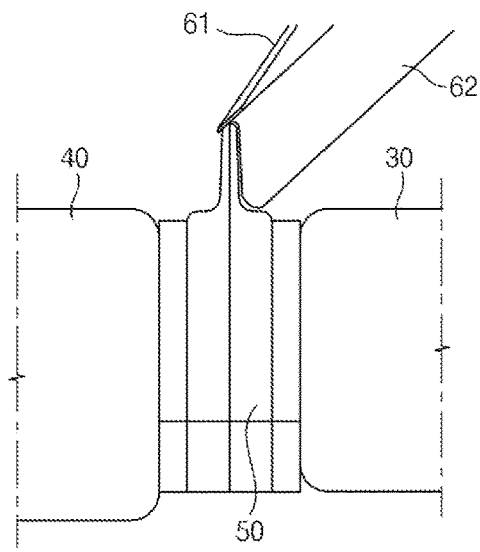
FIG. 6 is a view illustrating a configuration in which the extension part formed in the pressing part extends to a first corner.

As shown in FIG. 6 illustrating a configuration in which an extension part 62 formed in a pressing part 60 extends to a first corner 52*a*, the extension part 62 may have an extending structure to allow the first cup part 1 to be in close contact with the first corner 52*a* when the body part 61 of the pressing part allows the connection part 3 to be in close contact with the support protrusion 51.

Meanwhile, the pouch 10 provided in the present invention may have a structure in which an inner layer made of a polymer, an outer layer made of a different type of a polymer from the inner layer, and a metal layer stacked between the inner layer and an outer layer and made of an aluminum material, are stacked, and be manufactured so that the inner layer constitutes a sealant layer, and the outer layer constitutes a drawing assistance layer and a surface protection layer, and the metal layer constitutes a moisture barrier layer.

The sealant layer formed by the inner layer may be made of a polymer and formed as an innermost layer to be in direct contact with an electrode assembly. Since the sealant layer is in direct contact with the electrode assembly, the sealant layer has insulating nature and corrosion resistance against an electrolyte. Since the inside needs to be completely sealed to block material movement between the inside and the outside, the sealant layer has high sealability. Such a sealant layer may be made of at least one material selected from the group consisting of polyethylene, polypropylene, polycarbonate, polyethylene terephthalate, polyvinyl chloride, acryl-based polymer, polyacrylonitrile, polyimide, polyamide, cellulose, aramid, nylon, polyester, poly(p-phenylene benzobisoxazole), polyarylate, Teflon, and glass fiber.

The moisture barrier layer formed by the metal layer provides functions of securing the mechanical strength of the pouch 10, blocking entry and exit of gas, moisture, etc. outside the pouch 10, and preventing leakage of an electrolyte.

The surface protection layer included in the outer layer is formed as an outermost layer to protect the pouch 10 from friction and collision with the exterior and to electrically insulate an electrode assembly from the outside. In addition, the drawing assistance layer which may be included in the outer layer is located between the surface protection layer and the moisture barrier layer and provides a function of preventing the surface protection layer and the moisture barrier layer from being detached when drawn.

The present invention having the technical features as above may prevent a separation phenomenon of the connection part 3, since the pressing part 60 allows the connection part 3 to be in close contact with the support protrusion 51 during rotation of the upper nest 40.

The first protrusion 51*a* and the second protrusion 51*b* respectively define, as slopes, surfaces in contact with the first cup part 1 and the second cup part 2 so that the support protrusion 51 has a cross-sectional shape getting sharper towards an end. Accordingly, the first protrusion 51*a* and the second protrusion 51*b* may be brought into closer contact with outside surfaces of the first cup part 1 and the second cup part 2.

In addition, the protrusion length of the body part 61 of the pressing part 60 may be restricted so that an interference to rotation of the second cup part 2 does not occur when the connection part 3 is in close with the support protrusion 51.

Figure 7:
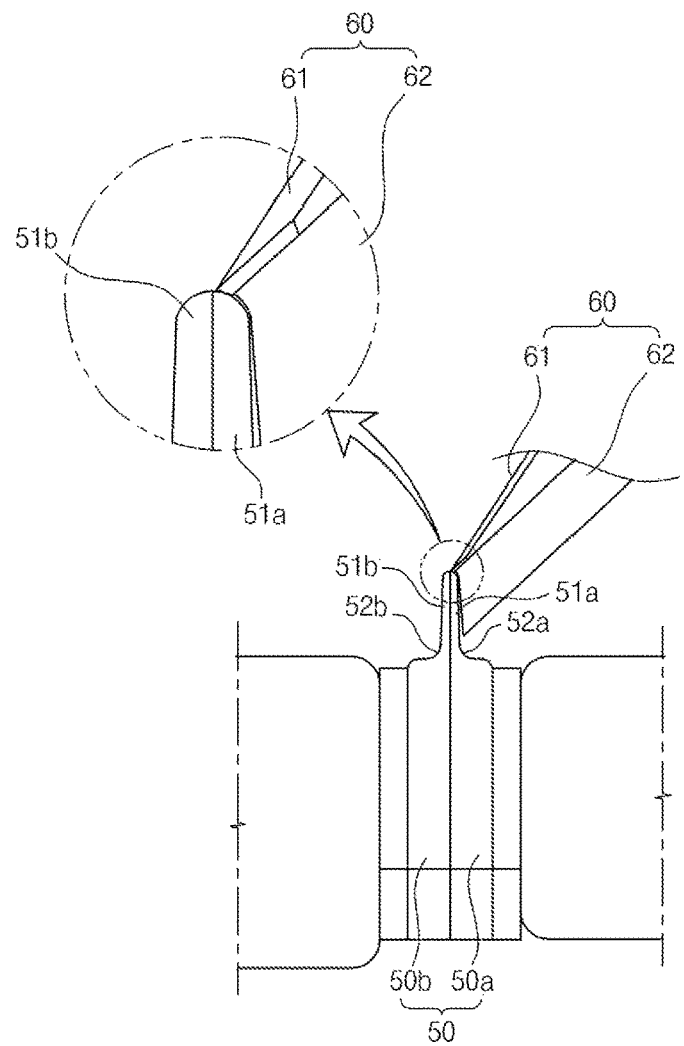
FIG. 7 is a view illustrating a configuration in which the pressing part having a body part formed relatively shorter therein is in contact with the support protrusion.

Referring to FIG. 7 illustrating a configuration in which the pressing part 60 having the body part 61 formed relatively shorter than the structure of the pressing part 60 described above is in contact with a support protrusion 51, the pressing part 60 may be formed a litter shorter than the embodiment described above so as to prevent occurrence of interference to folding of the connection part 3 according to the thickness or material of a pouch and to enable adjustment of a portion at which the connection part 3 starts to be bent.

That is, the pressing part 60 may be provided in a structure where the length of an end protruding from the extension part 62 is restricted to such an extent that when the extension part 62 is in close contact with the first protrusion 51*a*, the body part 61 is in contact only with the first protrusion 51*a* and not in contact with the second protrusion 51*b*.

In addition, a device for folding a pouch provided in the present invention may include a guide in which a second guide 50*b* is omitted and a first guide 50*a* is included alone.

That is, as illustrated in FIGS. 2 and 3, the pressing part 60 may press the connection part 3 on a surface of the first protrusion 51*a* during rotation of the second cup part 2, and thus the second guide 50*b* may be omitted.

Here, the first protrusion 51*a* may protrude only from the first guide 50*a* and have a shape of a combination with the second protrusion 51*b*.

Therefore, the device for folding the pouch in which the second guide 50*b* is omitted includes a lower nest on which the first cup part is seated, an upper nest on which the second cup part is seated therein, and a pressing part that allows a connection part of a first circumferential part and a second circumferential part to be in close contact with a support protrusion when the first cup part and the second cup part are seated on the lower nest and the upper nest, respectively. Here, the guide may be included in a configuration consisting only of a first guide, that is, in a structure where the guide is fixed to the lower nest and a first protrusion 51*a* protruding upwardly therefrom forms a support protrusion 51.

Alternatively, a guide 50 may include a second guide 50*b* together with a first guide 50*a*, and be provided in a structure where a first protrusion 51*a* is formed only on the first guide 50*a* and a second protrusion 51*b* is not be formed on the second guide 50*b*.

In the present invention having the configuration as above, the pressing part 60 includes a body part 61 that allows a connection part 3 of a first circumferential part 1*a* and a second circumferential part 2*a* to be in close contact with a support protrusion 51 and an extension part 62 that extends from the body part 61 and allows a sidewall surface of a first cup part 1 to be in close contact with a first protrusion 51a when the body part 61 presses the connection part 3. Accordingly, a wider portion is brought into close contact with the support protrusion 51, and thus the connection part may be more stably supported during folding.

In addition, a seating groove 63 is formed between the extension part 62 and the body part 61 so that an upper end of the support protrusion 51 is seated thereon. Accordingly, the pressing part 60 may be stably supported on the support protrusion 51.

Moreover, a first corner 52a is formed between surfaces that are perpendicular to each other as the first protrusion 51a protrudes from the first guide 50a, and when the body part 61 of the pressing part 60 allows the connection part 3 to be in close contact with the support protrusion, the extension part 62 allows the first cup part 1 to be in close contact with the first corner 52a. Accordingly, separation of the pressing part 60 may be prevented, and deformation of the first cup part 1 may be prevented.

Although the present invention has been described with reference to the limited embodiments and drawings, the present invention is not limited thereto and may be variously implemented by those of ordinary skill in the art to which the present invention pertains, within the technical idea of the present invention and an equivalent of the appended claims.

DESCRIPTION OF THE SYMBOLS

10: Pouch
30: Lower nest
40: Upper nest
50: Guide
60: Pressing part

The invention claimed is:

1. A device for folding a pouch having a first cup part and a second cup part, each of the first cup part and the second cup part having a concavely recessed shape to accommodate an electrode assembly, a first circumferential part formed flat along a circumference of the first cup part, a second circumferential part formed flat along a circumference of the second cup part, and a connection part connecting the first circumferential part and the second circumferential part, the device comprising,
  a lower nest on which the first cup part is configured to be seated;
  an upper nest on which the second cup part is configured to be seated;
  a guide comprising a first guide fixed to the lower nest and having a first protrusion protruding upwardly therefrom, and a second guide fixed to the upper nest and having a second protrusion protruding upwardly therefrom, the first protrusion and the second protrusion in close contact with each other to form a support protrusion; and
  a pressing part that allows the connection part to be in close contact with the support protrusion when the first cup part and the second cup part are seated on the lower nest and the upper nest, respectively,
  wherein, in a state where the pressing part allows the connection part to be in close contact with the support protrusion, the upper nest is configured to rotate so that the second cup part is folded onto the first cup part.

2. The device of claim 1, wherein, when the first guide and the second guide are in horizontal contact with each other, the lower nest and the upper nest are horizontal.

3. The device of claim 2, wherein, when the upper nest rotates, the first protrusion and the second protrusion in close contact with each other are separated to be spread apart from each other.

4. The device of claim 3, wherein the first protrusion is formed integrally with the first guide, and the second protrusion is formed integrally with the second guide.

5. The device of claim 1, wherein the first protrusion and the second protrusion respectively define, as slopes, surfaces in contact with the first cup part and the second cup part so that the support protrusion has a cross-sectional shape getting sharper towards an end.

6. The device of claim 1, wherein further comprising:
  a first corner formed between surfaces that are perpendicular to each other as the first protrusion protrudes from the first guide, and
  a second corner formed between surfaces that are perpendicular to each other as the second protrusion protrudes from the second guide.

7. The device of claim 1, wherein the pressing part comprises:
  a body part that allows the connection part to be in close contact with the support protrusion; and
  an extension part that extends from the body part and allows a sidewall surface of the first cup part into close contact with the first protrusion when the body part presses the connection part.

8. The device of claim 7, further comprising a seating groove is-formed between the extension part and the body part so that an upper end of the support protrusion is seated thereon.

9. The device of claim 7, wherein a first corner is formed between surfaces that are perpendicular to each other as the first protrusion protrudes from the first guide, and
  when the body part of the pressing part allows the connection part to be in close contact with the support protrusion, the extension part allows the first cup part to be in close contact with the first corner.

10. The device of claim 7, wherein an end protrudes from the extension part to such an extent that when the extension part is in close contact with the first protrusion, the body part is in contact only with the first protrusion and not in contact with the second protrusion.

11. A device for folding a pouch having a first cup part and a second cup part, each of the first cup part and the second cup part having a concavely recessed shape to accommodate an electrode assembly, and a first circumferential part formed flat along a circumference of the first cup part, and a second circumferential part formed flat along a circumference of the second cup part, and a connection part connecting the first circumferential part and the second circumferential part, the device comprising,
  a lower nest on which the first cup part is configured to be seated;
  an upper nest on which the second cup part is configured to be seated;
  a guide fixed to the lower nest and having a support protrusion protruding upwardly therefrom; and
  a pressing part that allows the connection part to be in close contact with the support protrusion when the first cup part and the second cup part are seated on the lower nest and the upper nest, respectively,
  wherein, in a state where the pressing part allows the connection part to be in close contact with the support protrusion, the upper nest is configured to rotate so that the second cup part is folded onto the first cup part.

12. The device of claim 11, wherein the pressing part comprises:
a body part that allows the connection part to be in close contact with the support protrusion, and
an extension part that extends from the body part and allows a sidewall surface of the first cup part to be in close contact with the support protrusion when the body part presses the connection part.

13. The device of claim 12, further comprising a seating groove formed between the extension part and the body part so that an upper end of the support protrusion is seated thereon.

14. The device of claim 12, further comprising:
a first corner formed between surfaces that are perpendicular to each other as the support protrusion protrudes from the guide, and
wherein, when the body part of the pressing part allows the connection part to be in close contact with the support protrusion, the extension part allows the first cup part to be in close contact with the first corner.

15. The device of claim 1, wherein the pouch comprises a stack of an inner layer made of a polymer; an outer layer made of a different type of a polymer from the inner layer; and a metal layer stacked between the inner layer and an outer layer and made of an aluminum material.

16. The device of claim 11, wherein the pouch comprises a stack of an inner layer made of a polymer; an outer layer made of a different type of a polymer from the inner layer; and a metal layer stacked between the inner layer and an outer layer and made of an aluminum material.

* * * * *